US012783741B2

(12) United States Patent
Goodson, II et al.

(10) Patent No.: US 12,783,741 B2
(45) Date of Patent: Nov. 3, 2026

(54) INTERFACE CONTROLLER FOR COMMODITY DEVICES

(71) Applicant: HEWLETT PACKARD ENTERPRISE DEVELOPMENT LP, Spring, TX (US)

(72) Inventors: Stewart Gavin Goodson, II, Houston, TX (US); Daniel Humphrey, Tomball, TX (US); Robin Kelley Schrader, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 28 days.

(21) Appl. No.: 18/887,181

(22) Filed: Sep. 17, 2024

(65) Prior Publication Data

US 2025/0013791 A1 Jan. 9, 2025

Related U.S. Application Data

(62) Division of application No. 17/606,655, filed as application No. PCT/US2019/043880 on Jul. 29, 2019, now Pat. No. 12,105,863.

(51) Int. Cl.
*G06F 21/85* (2013.01)
*G06F 21/56* (2013.01)
(Continued)

(52) U.S. Cl.
CPC ............ *G06F 21/85* (2013.01); *G06F 21/566* (2013.01); *G06F 21/602* (2013.01); *G06F 21/64* (2013.01);
(Continued)

(58) Field of Classification Search
CPC ........ G06F 21/64; G06F 21/81; G06F 21/602; G06F 21/79; G06F 21/71; G06F 21/85; G06F 21/566; G06F 2212/1052
(Continued)

(56) References Cited

U.S. PATENT DOCUMENTS 6,453,278 B1 * 9/2002 Favor .................. G06F 9/30167
712/E9.046
7,424,398 B2 9/2008 Booth et al.
(Continued)

OTHER PUBLICATIONS

Search Report and Written Opinion received for PCT Application No. PCT/US2019/043880, mailed on Apr. 27, 2020, 09 pages.
(Continued)

*Primary Examiner* — Amare F Tabor
(74) *Attorney, Agent, or Firm* — Hewlett Packard Enterprise Patent Department

(57) ABSTRACT

A method, system, and device for using an interface controller to validate and authenticate controller code for a commodity device to be included within a computer system (e.g., a power supply) are provided. In one example, a commodity device controller includes dynamic memory for control software (e.g., control code to control operation of the commodity device) that may be validated (and/or updated) using an interface controller. The interface controller may perform this update/validation at startup (or run-time) to ensure secure control over aspects of the computer device including the commodity device control code. If a security risk is detected it may be mitigated in various ways, including disabling of the commodity device. Control code provided by third-parties (e.g., supplier of commodity device) may be validated and secured using disclosed techniques.

16 Claims, 9 Drawing Sheets

(51) Int. Cl.

| | |
|---|---|
| ***G06F 21/60*** | (2013.01) |
| ***G06F 21/64*** | (2013.01) |
| ***G06F 21/71*** | (2013.01) |
| ***G06F 21/79*** | (2013.01) |
| ***G06F 21/81*** | (2013.01) |

(52) U.S. Cl.
CPC .............. *G06F 21/71* (2013.01); *G06F 21/79* (2013.01); *G06F 21/81* (2013.01); *G06F 2212/1052* (2013.01)

(58) Field of Classification Search
USPC .......................................................... 713/193
See application file for complete search history.

(56) References Cited

U.S. PATENT DOCUMENTS

| | | | | |
|---|---|---|---|---|
| 7,805,766 | B2 * | 9/2010 | Christensen ............ | H04L 45/00 713/153 |
| 7,853,780 | B2 | 12/2010 | Rotondo et al. | |
| 7,984,304 | B1 | 7/2011 | Waldspurger et al. | |
| 8,375,369 | B2 | 2/2013 | Mensch et al. | |
| 8,661,265 | B1 * | 2/2014 | Dunn ...................... | G06F 21/79 710/316 |
| 8,719,589 | B2 * | 5/2014 | Henry ................... | H04L 9/0861 712/225 |
| 10,282,549 | B2 | 5/2019 | Cisneros et al. | |
| 11,263,308 | B2 | 3/2022 | Mondello et al. | |
| 11,847,227 | B2 | 12/2023 | Tsirkin et al. | |
| 2004/0153679 | A1 * | 8/2004 | Fitton ..................... | G06F 1/324 713/322 |
| 2005/0055588 | A1 | 3/2005 | Nalawadi et al. | |
| 2005/0076226 | A1 | 4/2005 | Boivie et al. | |
| 2005/0216904 | A1 | 9/2005 | Needham | |
| 2006/0059369 | A1 | 3/2006 | Fayad et al. | |
| 2011/0093741 | A1 | 4/2011 | Liang et al. | |
| 2013/0132752 | A1 | 5/2013 | Chen | |
| 2013/0152206 | A1 * | 6/2013 | Staubly ................... | G06F 21/79 726/26 |
| 2013/0191622 | A1 | 7/2013 | Sasaki et al. | |
| 2015/0286821 | A1 | 10/2015 | Ghose | |
| 2017/0053111 | A1 | 2/2017 | Stewart et al. | |
| 2018/0004959 | A1 | 1/2018 | Chen et al. | |
| 2018/0165455 | A1 | 6/2018 | Liguori et al. | |
| 2018/0189195 | A1 | 7/2018 | Chun et al. | |
| 2019/0102538 | A1 | 4/2019 | Gentili et al. | |

OTHER PUBLICATIONS

Stmicroelectronics, “Introduction to STM32 Microcontrollers Security,” Feb. 2019, pp. 1-47, AN5156.

* cited by examiner

INTERFACE CONTROLLER FOR COMMODITY DEVICES

BACKGROUND

Computer systems are built from components to create an overall processing system. Components are sometimes provided by third-parties for use by a computer system manufacturer. Some components may be considered "commodity devices" in that there are multiple third parties that may compete to cost effectively provide components that conform to certain specifications. Different models of a computer system may be built from slightly different commodity devices that have substantially similar operational characteristics.

One example of a commodity device for a computer system is a power supply. As long as a power supply conforms to certain operational specifications that are acceptable to the computer system manufacturer, it may be utilized as a "commodity" for building the overall processing system. Other examples of commodity devices are disk drives, memory modules, network controllers, etc. This list is representative only and is neither exclusive nor exhaustive. In some cases, commodity devices may include control software that dictates how the commodity device will operate at run-time. This control software may be referred to as simply "control code" and may have different versions that change over time (e.g., to address defects or upgrades).

Security of computer systems remains a concern of many users. There may also be an increased level of concern for different types of users for computer systems (e.g., based on their industry or application). Specifically, a computer system providing financial transactions will likely have a higher level of security control as opposed to a personal use computer system. Similarly, a national defense department computer may have an even higher level of concern over that of a financial system. In any case, security of computer systems remains a concern to varying degrees regardless of how that computer system is used. To secure a computer system, it may be desirable to validate all operational code (including the above mentioned control code) against potential compromise by unintended actors (e.g., viruses, malicious attackers, unexpected alterations, etc.).

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not need serial processing and therefore may be performed in an order different than shown or possibly in parallel with each other. For a detailed description of various examples, reference will now be made to the accompanying drawings, in which.

DETAILED DESCRIPTION

Figure 1:
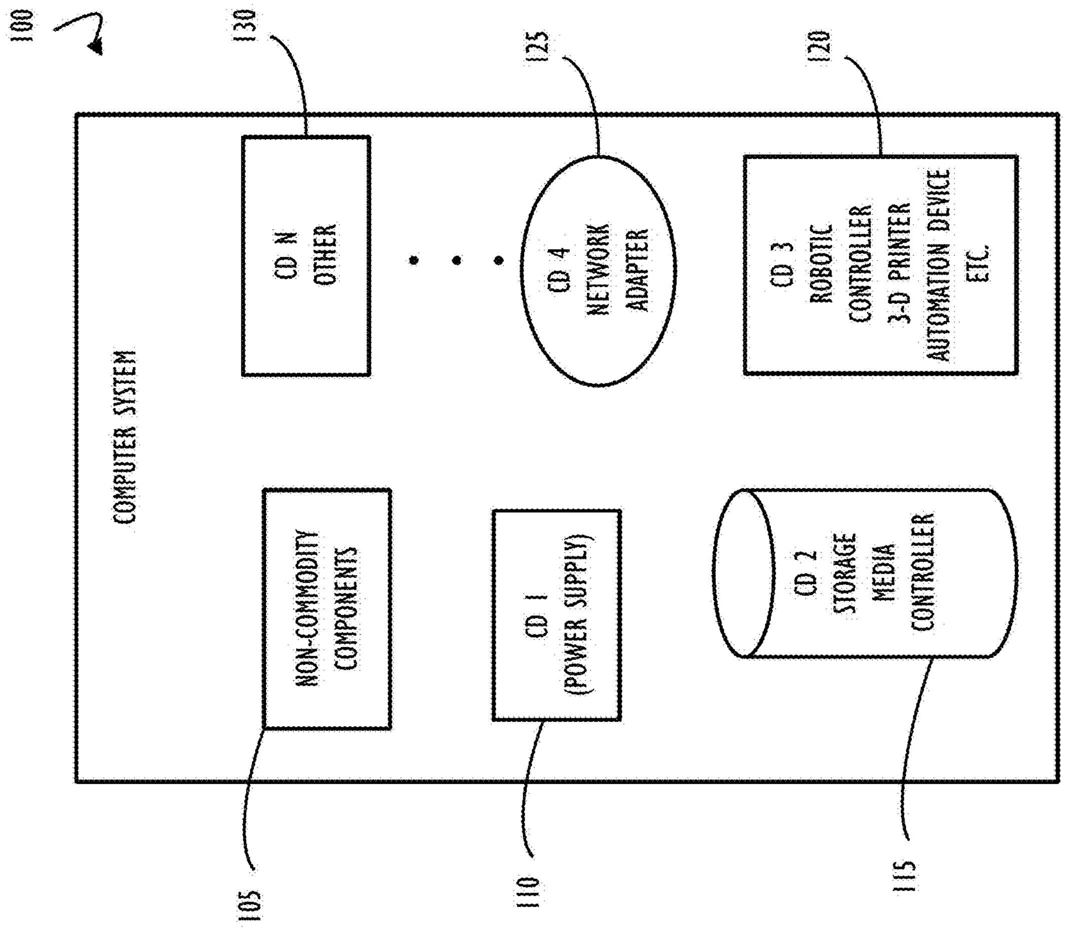
FIG. 1 illustrates an overview of a computer system including a set of non-commodity components and examples of different commodity type components, according to one or more disclosed examples.

Illustrative examples of the subject matter claimed below will now be disclosed. In the interest of clarity, not all features of an actual implementation are described for every example implementation in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

A method, system, and device for using an interface controller to validate and authenticate controller code for a commodity device (e.g., a power supply) to be included within a computer system are provided. In one example, a commodity device controller includes dynamic memory for control software (e.g., control code to control operation of the commodity device) that may be validated (and/or updated) using a trusted interface controller. The interface controller may perform this update/validation at startup (or run-time) to ensure secure control over aspects of the computer device including the commodity device control code. If a security risk is detected it may be mitigated in various ways, including disabling of the commodity device. Control code provided by third-parties (e.g., supplier of commodity device) may be validated using disclosed techniques.

As used herein, "commodity device" refers to any component or device that is provided as part of a computer system as an "add-on" component that may be interchangeable across different suppliers for that component. Although, implementations of disclosed techniques may be utilized for any type of commodity device that includes a controller that operates according to control code, for ease of discussion, this disclosure will utilize an example commodity device of a power supply. Other non-limiting examples of commodity devices for which the disclosed techniques may be utilized may include storage devices (e.g., hard-disk drives (HDDs), solid-state drives (SSDs), etc.), memory modules, network interface cards, expansion cards, fans, liquid coolant pumps, etc. Different types of commodity devices may utilize different "amounts" of control code based on their intended use within the computer system. However, disclosed techniques for validation, upload, and overall security are applicable regardless of the complexity of the control code. Providing an interface controller as disclosed herein to validate and at least partially isolate a commodity device represents an improvement to the overall security and change control (e.g., configuration change management ("CM")) procedures available for system administrators.

Power supplies generally include one or more controllers that control various components of the power supply, and these controllers operate according to control code executed thereby. Historically, the controllers of power supplies were typically microcontrollers that included or utilized non-volatile memory to store their power supply control code. In contrast, in some implementations disclosed herein, the power supply control code of a controller may be loaded to a volatile memory area (e.g., random access memory "RAM") associated with the controller during operation. For example, according to disclosed techniques, a power supply may include control code that may be used, for example, to control power factor correction ("PFC") and DC-DC functions of a power supply. Example power supplies may include controllers that store their functional code in the above-referenced volatile RAM, such as a primary-side controller to control a primary conversion stage (which may, for example, perform power factor correction ("PFC") and AC-DC conversion) and a secondary-side controller to control a secondary conversion stage (which may perform galvanic isolation and DC-DC conversion.

The control code may have been developed by a third party (e.g., the supplier of the power supply) and represent a known version of control code. Alternatively, control code may be developed by the computer system manufacturer. In a third example, the control code may be a composite of third party code and internally developed code. In any case, a known version of control code may be identified and a unique identification (e.g., checksum, hash key, or some type of digital signature) generated. The generated unique identification may be used for later validation to ensure the known version of control code has not been altered.

Additionally, according to disclosed techniques, control code may not be statically stored where the controllers of the power supply can access it (e.g., internal to the power supply on non-volatile memory accessible to the controllers). Instead the control code may be loaded into the volatile RAM of the controllers when needed by another trusted controller (e.g., a processor of the disclosed interface controller), whose own control code is not developed by a third party. That is, the code of the trusted controller may be considered "trusted code." This additional trusted controller may be generally referred to as an "interface controller" and may include a processor that is capable of generating and validating the above-referenced digital signature (e.g., cryptographic keys and hashes). This interface controller may be implemented as an internal component of the power supply or be implemented externally to the power supply (e.g., on a system board). Different types of implementations may depend on design criteria such as number of available interface slots on a system board, physical space considerations, or other technical or manufacturing specifications. In any case, the disclosed interface controller may be used to perform initialization and authentication functions with respect to control code prior to that control code becoming operational for the commodity device of the computer system.

One concern addressed by disclosed techniques relates to third party code in a commodity (e.g., power supply) that is incorporated into a larger system. This third party code may be suspect or subject to alteration and present a potential security issue. For example, malicious code may be embedded within the code that may be later leveraged to implement some sort of attack against the computer system. For a power supply, one type of attack (among many) may be a denial of service ("DOS") attack where an outside actor may cause the power supply to turn-off and thus cause the computer system to be non-operational. If an attacker were to be able to turn-off one or more critical systems within a data center network, the data center network may be compromised. Further, unexpected alteration of control code may represent a risk to the data center network.

Typically, corporations and other users of data center networks implement strict change control procedures commonly referred to as change management such that any changes to computer systems (or components thereof) are only made based on a known schedule and are only made from a known version of code to another known version of code. That is, the upgrade and maintenance of computer systems within a data center network may be strictly controlled and audited. For data center networks that have a higher level of criticality, the CM procedures may be increased over those applied to a less critical infrastructure.

In summary, disclosed techniques allow for changing how control code is stored (e.g., volatile memory rather than non-volatile memory) and accessed for power supplies (or other commodity devices). Further, a level of indirection may be introduced via an interface controller that may be used to authenticate and load run-time control code into the volatile memory for run-time use to control the power supply. Authenticating the validity of control code at runtime may utilize hardware capable of generating and validating cryptographic keys and hashes as well as the sharing of private keys. The disclosed techniques that utilize an interface controller may reduce complexity and expense to provide a cost sensitive solution.

In some implementations, the disclosed interface controller is designed to securely validate its own contents at boot. An interface controller may include a non-volatile memory, such as an NVRAM, that stores hash values (hash values represent one type of digital signature) for control code associated with each RAM controller in the power supply. Thus, at power on, the interface controller may read the control code for each RAM controller and calculate a cryptographic hash (digital signature). Depending on implementation specifications, different secure cryptographic hashing algorithms or digital signature techniques may be used (e.g., a secure hash algorithm ("SHA") such as SHA-256). As used herein, a "RAM controller" refers to a controller that dynamically loads the above referenced control code into a volatile memory area as part of its initialization process. For example, a RAM controller may be contrasted to a controller that obtains its operational code from non-volatile memory. As explained in this disclosure, a RAM controller may be secured by providing a validation of its control code, for example, by authenticating a version of control code against a digital signature as part of uploading the version of control code to the RAM controller (e.g., before the RAM controller becomes operational).

The processor of the interface controller may then compare each generated hash to a corresponding previously stored hash (e.g., stored in NVRAM of the interface controller). If all of the calculated hashes match the stored hashes, then the interface controller may program the corresponding control code into each of the RAM controllers of the power supply. This programming can be accomplished using standard programming pins and protocols or through a communication bus which can implement a proprietary protocol. In general, this may be considered an "upload" of the control code to each respective RAM controller. For example, the communication bus can be implemented with a RAM controller via hardware, a state machine, or by using a limited amount of NVM that stores a loading program. Other techniques are also possible. Disclosed techniques for validation and upload may be performed in parallel with other system initialization functions to result in a net-zero boot time increase for the computer system.

In some implementations, to enable updates to the control code for different RAM controllers, the interface controller may optionally include a bootloader that accepts update of signed images. RAM controller images may be validated and optionally digitally signed by the first party or a signature may be provided along with the code from the third party. In either case, a trusted digital signature may be associated with each image (e.g., version of controller code stored as a "signed image"). The interface controller may then receive an image (e.g., new control code image) over a communication bus. Upon receipt the interface controller may than validate/register each image and an associated signature. Once validated, the interface controller may replace the previous control code image for each corresponding RAM controller.

Referring now to FIG. 1, an overview of a computer system 100 including a set of non-commodity components 105 (e.g., components proprietary to the computer system manufacturer) and example commodity devices (e.g., provided by a third-party) are illustrated. One or more of these commodity devices may be implemented using an interface controller and securely managed control code according to disclosed techniques. In the example of FIG. 1, commodity devices include commodity device ("CD") 1 representing a power supply 110, commodity device 2 representing a storage media controller 115, commodity device 3 representing a controller 120 for an externally controlled device (e.g., robotic controller, 3-D printer, or automation device), commodity device 4 representing a network adapter 125, and commodity device N representing some other device 130 either internal or external to computer system 100.

As illustrated in FIG. 1, computer system 100 may include any number of commodity components (e.g., power supply 110, storage media controller 115, etc.) and non-commodity components 105. Disclosed techniques are illustrated for commodity components but may also be applicable, in some circumstances, to control of non-commodity components. For example, in a highly secure infrastructure network, system administrators may desire the improved control capabilities for CM that are discussed for typically less secure commodity devices. In some cases, a computer system 100 manufacturer will include some commodity devices within an initial configuration. In other cases, commodity devices may be installed or attached to a computer system after receipt by an end-user of computer system 100. Specifically, computer system 100 may be initially configured without a power supply and the power supply may be installed as part of provisioning that system for use in a corporate network. In any case, disclosed techniques allow for an interface controller (explained below) to provide validation, update, and security with respect to control code for a commodity device after the commodity device is installed in computer system 100.

Figure 2A:
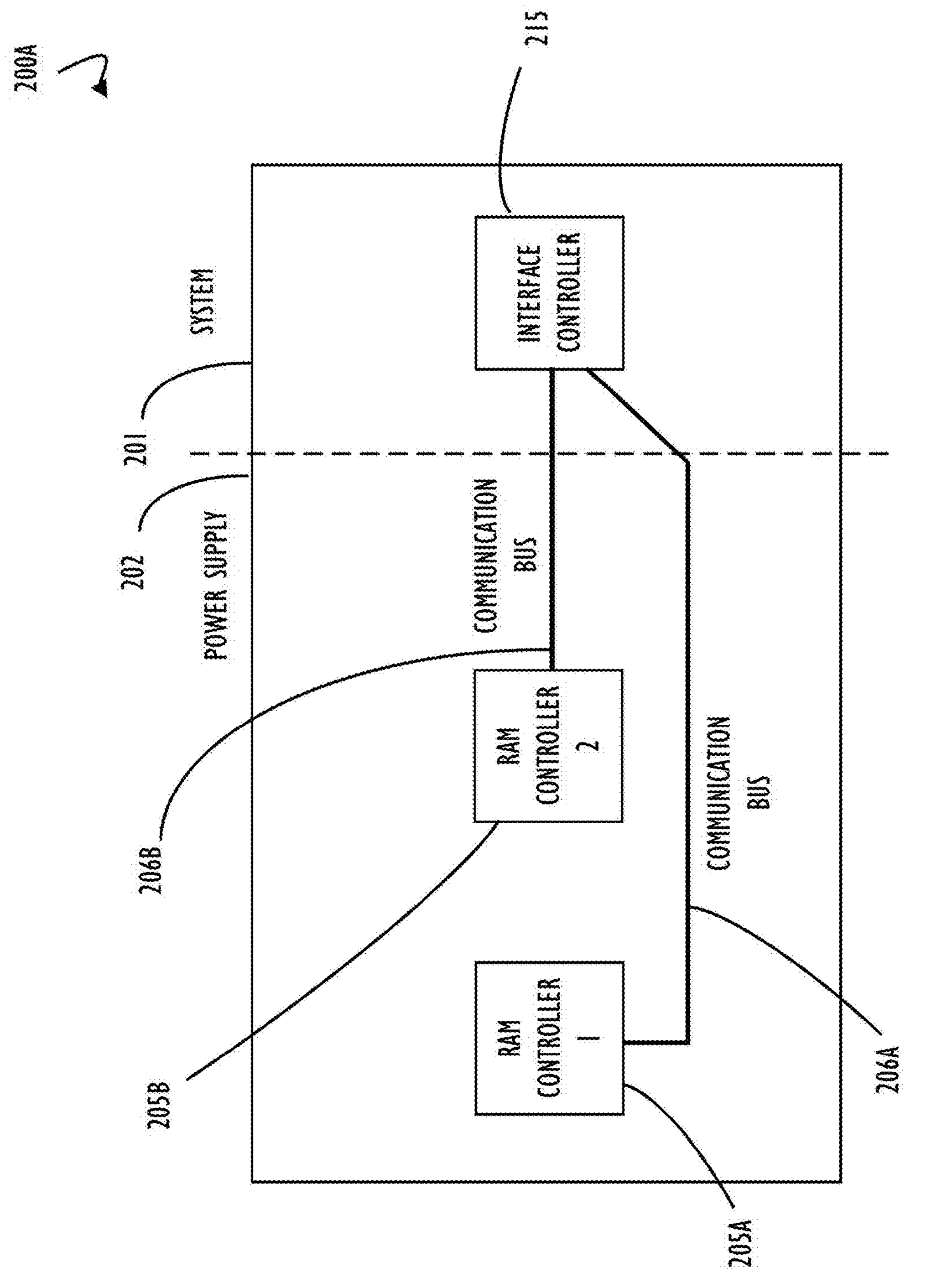
FIG. 2A illustrates a block diagram representing a relationship between a power supply, including RAM controllers, an interface controller, and a computer system, according to one or more disclosed examples.

Referring now to FIG. 2A, an example block diagram illustrates computer system 200A. Computer system 200A includes an example power supply portion 202 and system portion 201 (separated by a dashed line to indicate a logical segregation). Computer system 200A further includes interface controller 215 that may be used to facilitate disclosed techniques for controlling versions of control code for each of RAM controller 1 (205A) and RAM controller 2 (205B). In FIG. 2A, two RAM controllers are illustrated, however, disclosed techniques may be implemented using a single interface controller 215 to manage any number of RAM controllers.

As illustrated in FIG. 2A, interface controller 215 may communicate with RAM controller 1 (205A) through communication bus 206A. Interface controller 215 may also communicate with RAM controller 2 (205B) through communication bus 206B. Each of communication bus 206A and communication bus 206B may be used to exchange information between interface controller 215 and a respective RAM controller. The information exchanged may include an upload of control code for a RAM controller and for validation of code already present on a RAM controller (e.g., validation of a digital signature). Each communication bus 206A, 206B may be implemented in a variety of ways depending on an amount of data transfer expected via the communication bus. In some implementations, the communication bus may be implemented via pin-out connections of a power supply. Alternatively, or additionally, a traditional data bus (e.g., multi-wire connection using a ribbon cable) may be provided between interface controller 215 and each respective RAM controller (205A and 205B). Interface controller 215 may be logically (and possibly physically) incorporated into computer system 200A to provide a level of indirection and additional security for computer system 200A according to disclosed implementations.

Figure 2B:
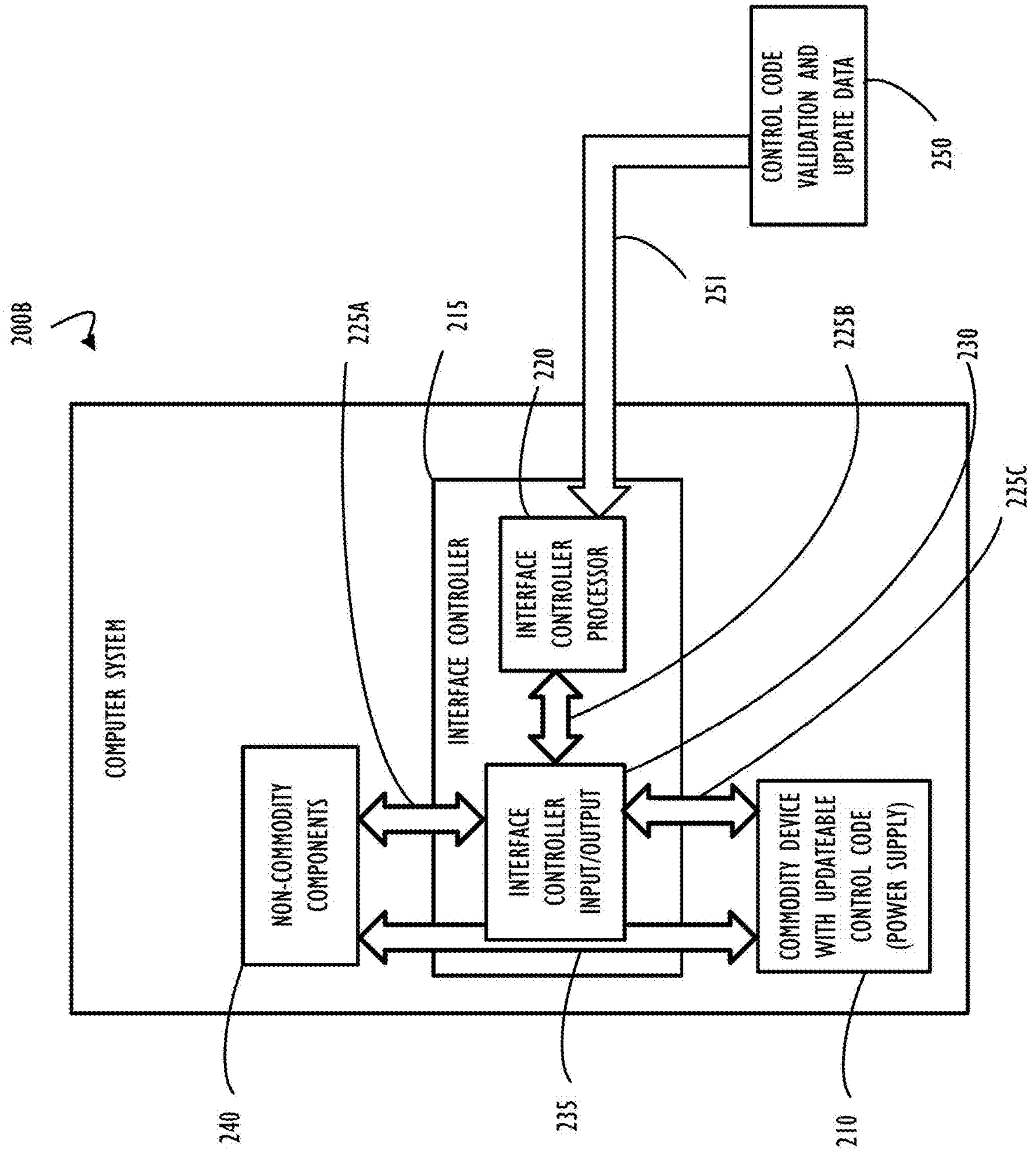
FIG. 2B illustrates a block diagram representing an interface controller that may be included to at least partially isolate and validate an "internal" commodity component within the context of an overall computer system, according to one or more disclosed examples.

FIG. 2B illustrates further details regarding interaction of interface controller 215 with respect to a second example computer system 200B. Computer system 200B may be similar to each of computer system 200A and computer system 100 discussed above. FIG. 2B extends the example of FIG. 2A to include additional detail and data flows. For example, FIG. 2B includes control code validation and update area ("CCVUA") 250. CCVUA 250 may be implemented on local storage, such as, internally to an interface controller (e.g., in non-volatile storage attached to the interface controller) or on other memory within computer system 200B. Alternatively, computer system 200B may have access to a remote storage area (e.g., accessible via a computer network) that includes CCVUA 250. CCVUA 250 may include versions of control code and associated digital signatures to facilitate disclosed techniques for managing control code for RAM based controllers. CCVUA 250 may be accessible via data flow 251. Data flow 251 is illustrated as a read-only unidirectional data flow from CCVUA 250 to interface controller processor ("ICP") 220 but may, in some cases, be implemented as a bidirectional (e.g., read/write) data flow.

Computer system 200B includes non-commodity components 240 that may be similar to non-commodity components 105 from FIG. 1 discussed above. Computer system 200B also includes at least one commodity device 210 with updatable control code. In this example, commodity device 210 is represented as a power supply. Interface controller 215 includes an interface controller processor ("ICP") 220. ICP 220 may be a microcontroller embedded within (or connected to) a printed circuit board ("PCB") used to construct interface controller 215. ICP 220 may have sufficient processing power to perform disclosed encryption, validation, and data transfer capabilities as discussed herein. Interface controller 215 further includes interface controller input/output ("ICIO") 230. ICIO 230 includes communication path 225B to ICP 220, communication path 225A to non-commodity components 240, and communication path 225C to commodity component 210. In this manner the collective set of communication paths 225A-C allow ICP 220 to be aware of data being shared or provided to either or both of non-commodity components 240 and commodity device 210.

An alternate communication path 235 is also illustrated for computer system 200B. According to some disclosed implementations, communication path 235 may be used after validation and initialization of a RAM controller associated with commodity device 210. Communication path 235 is illustrated as partially overlapping with ICIO 230 to indicate that some data flow (after initialization and validation) between a commodity device (e.g., commodity device 210) and non-commodity components 240 may be implemented as a "pass-through" of ICIO 230 or may simply bypass ICIO 230. Further, in some cases, a commodity device (after initialization and validation) may be implemented to allow communication without involvement of interface controller 215. In this manner, an interface controller 215 and corresponding ICP 220 may interact with commodity device 210 at startup of computer system 200B and then allow further operational use of commodity device 210 without having data communication flow through ICIO 235 (or interface controller 215). For example, the interaction at startup may include validation and upload of control code to a RAM controller (as discussed above) and then allow run-time operation for commodity device 210 independently from interface controller 215.

Figure 3A:
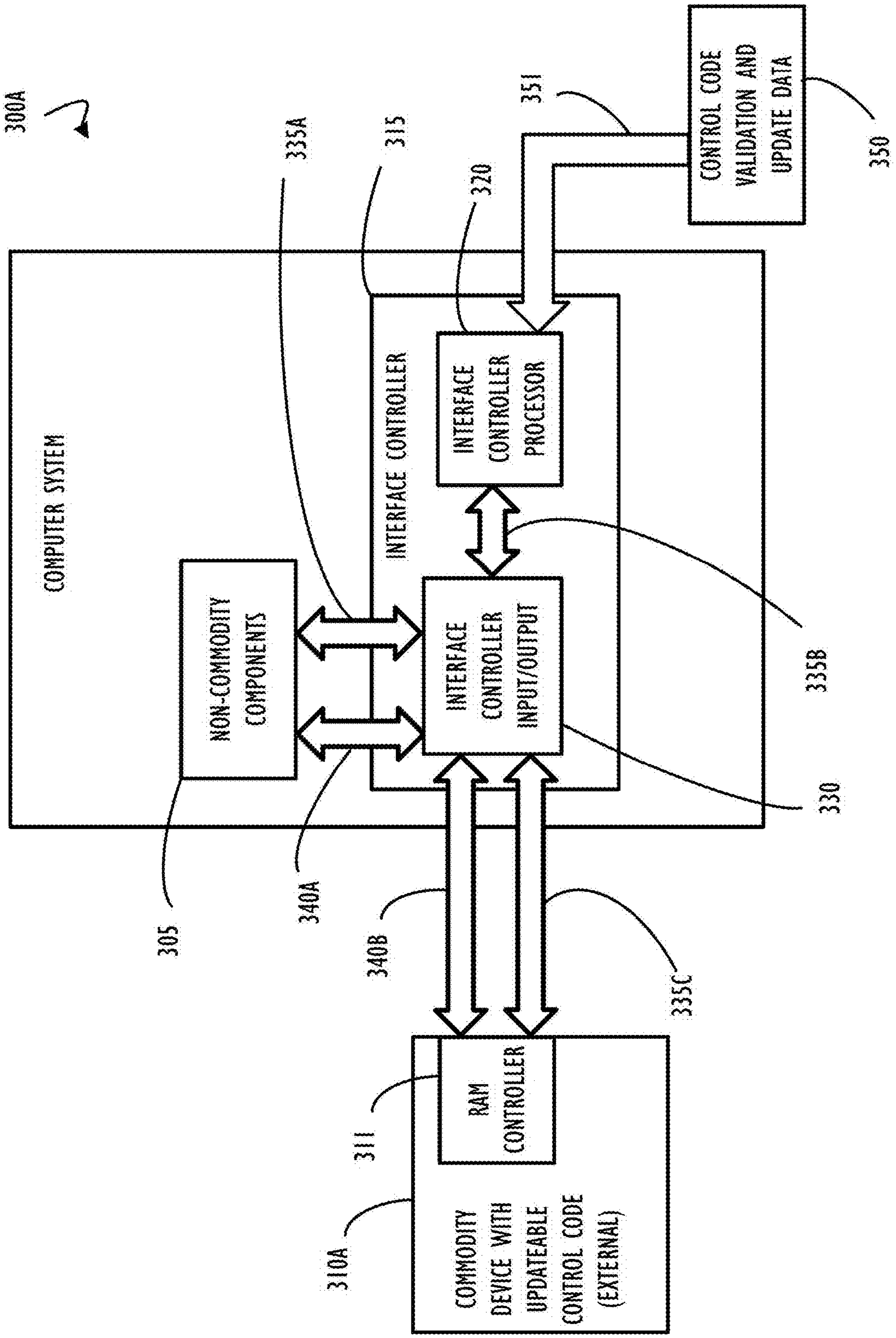
FIG. 3A illustrates a block diagram representing an interface controller and an "external" commodity component (or externally attached device) as an alternative configuration to that of FIG. 2, according to one or more disclosed examples.

Referring now to FIG. 3A, computer system 300A including non-commodity components 305 is illustrated as another example implementation, according to disclosed techniques. Computer system 300A is illustrated to have commodity device 310A as an external device with respect to computer system 300A. As in example computer system 200B from FIG. 2B, there is a CCVUA 350 that may communicate to ICP 320 via data path 351. ICP 320 may communicate with ICIO 330 via data path 335B. Because commodity device 310A is illustrated as an external commodity device, the example of computer system 300A illustrates that data flows 335A, 335B, and 335C may be used for initialization, validation, and upload for any RAM controller 311 that is included within commodity device 310A. Also, data flows 340A and 340B may be used for operation at run-time (e.g., after validation at startup) and not include processing by ICP 320.

Figure 3B:
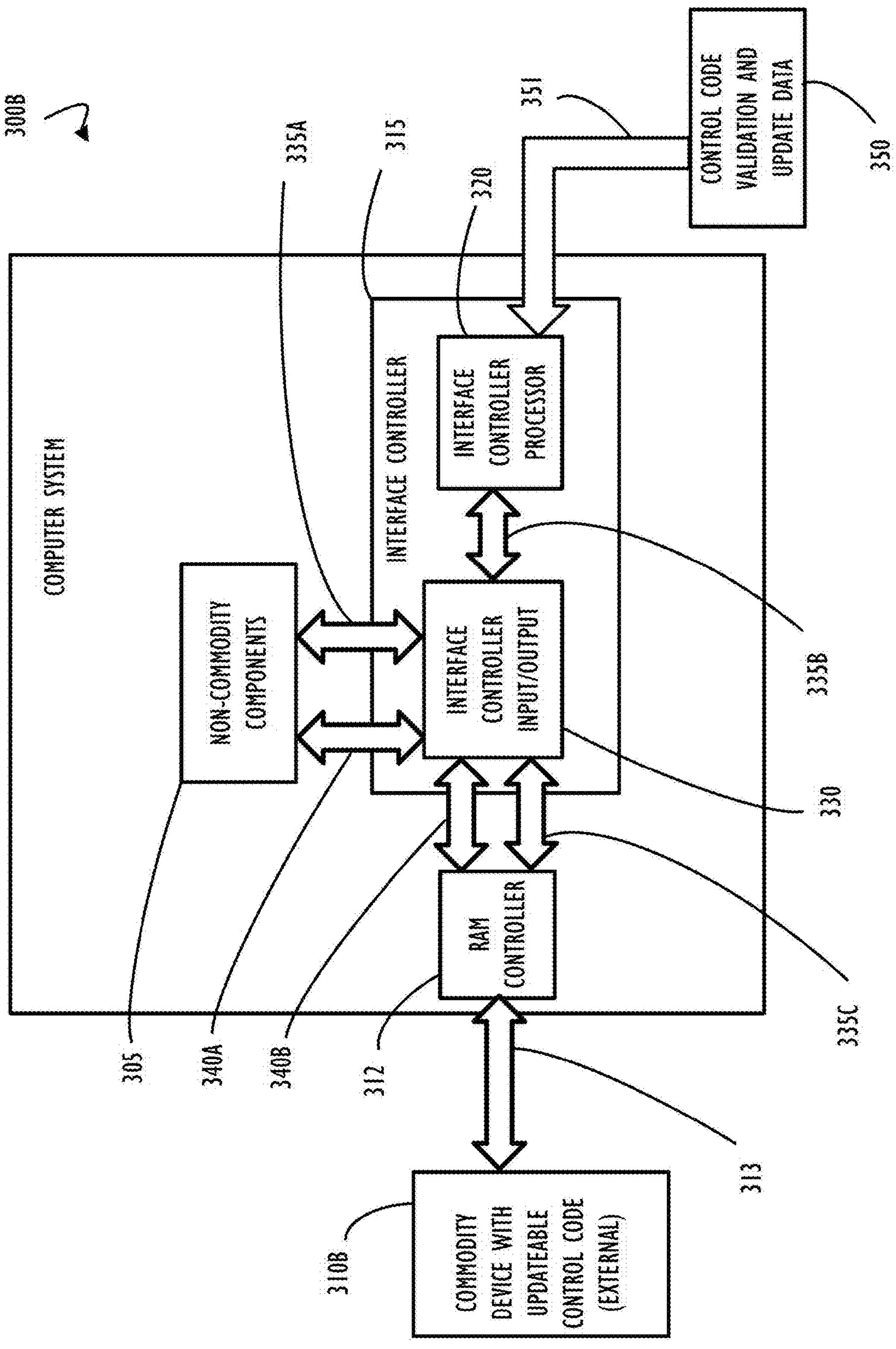
FIG. 3B illustrates a block diagram representing an interface controller and an internal controller for an "external" commodity component as an alternative to the configuration of FIG. 3A, according to one or more disclosed examples.

Referring now to FIG. 3B, computer system 300B is illustrated as a variation of computer system 300A where a RAM controller 312 is included within computer system 300B to interface with external commodity device 310B. In this example, RAM controller 312 may represent a dedicated controller for external commodity device 310B. As illustrated RAM controller 312 may receive updates and validation in a similar manner to that discussed above with respect to interaction between RAM controller 311 and computer system 300A but RAM controller 312 further includes data flow 313 to communicate between computer system 300B and external commodity device 310B.

Figure 3C:
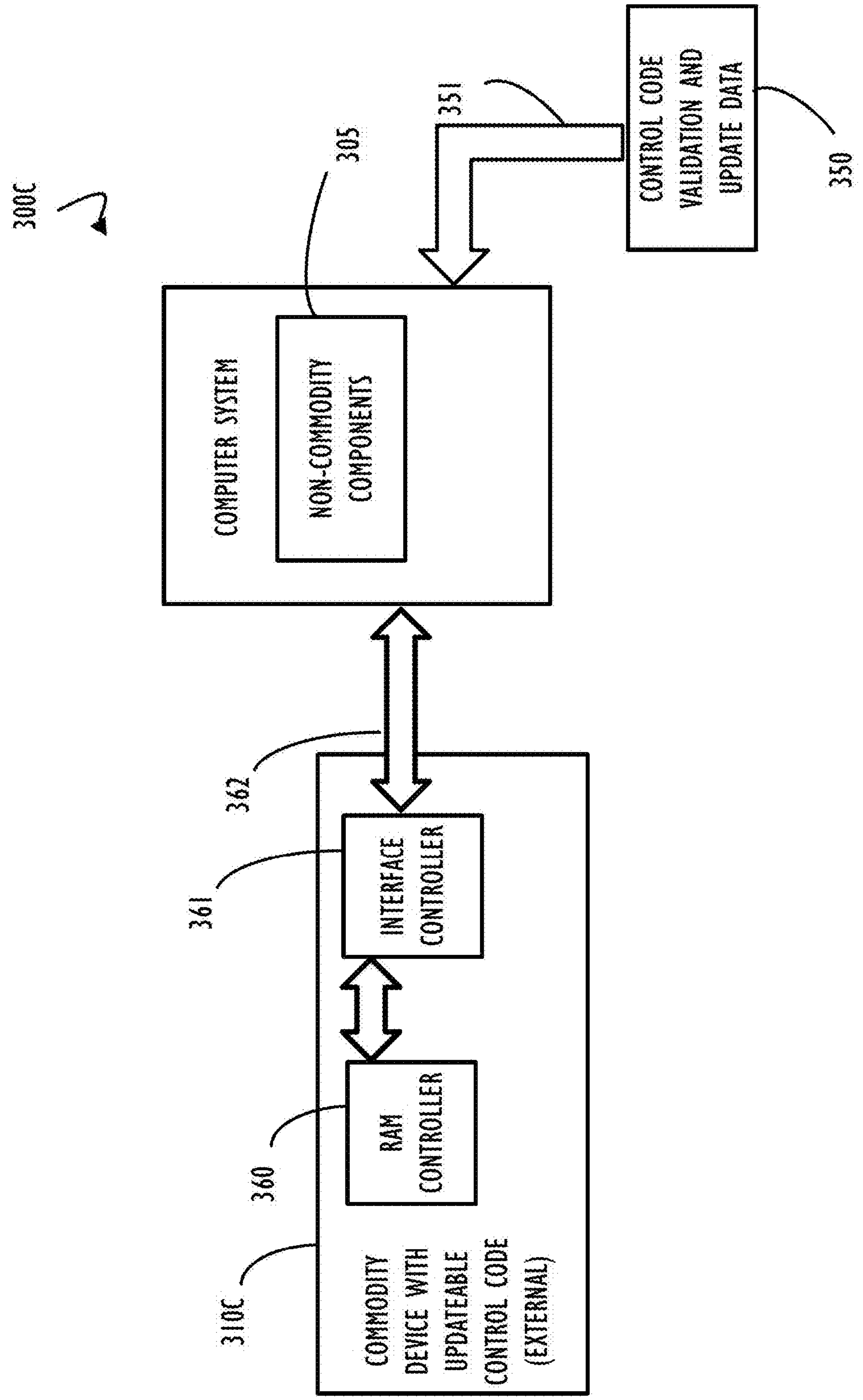
FIG. 3C illustrates a block diagram representing an interface controller included as internal controller for an "external" commodity component as an alternative to the configurations of FIGS. 3A-B, according to one or more disclosed examples.

Referring not to FIG. 3C, computer system 300C is illustrated as a variation of computer systems 300A-B where both a RAM controller 360 and an interface controller 361 are included within commodity device 310C. Communication between computer system 300C and interface controller 361 of commodity device 310C is illustrated by data flow 362. In this example configuration, a commodity device such as commodity device 310C may "internally" perform validation and update of RAM controller 360 at the direction of computer system 300C, for example, using information from CCVUA 350.

Several different implementation examples have been provided and discussed in detail (e.g., computer systems 100, 200B, and 300A-C). Other configurations are also possible without departing from disclosed techniques. In general, an interface controller may be provided to validate, upload, and secure code on a RAM controller that utilizes control code to provide operational functionality for a commodity device such as a power supply. The control code may be provided by a third party and may be controlled using cryptographic hashes and digital signatures that are generated in a trusted manner (e.g., by a first party such as the computer system manufacturer or a third party such as the commodity device manufacturer).

Figure 4:
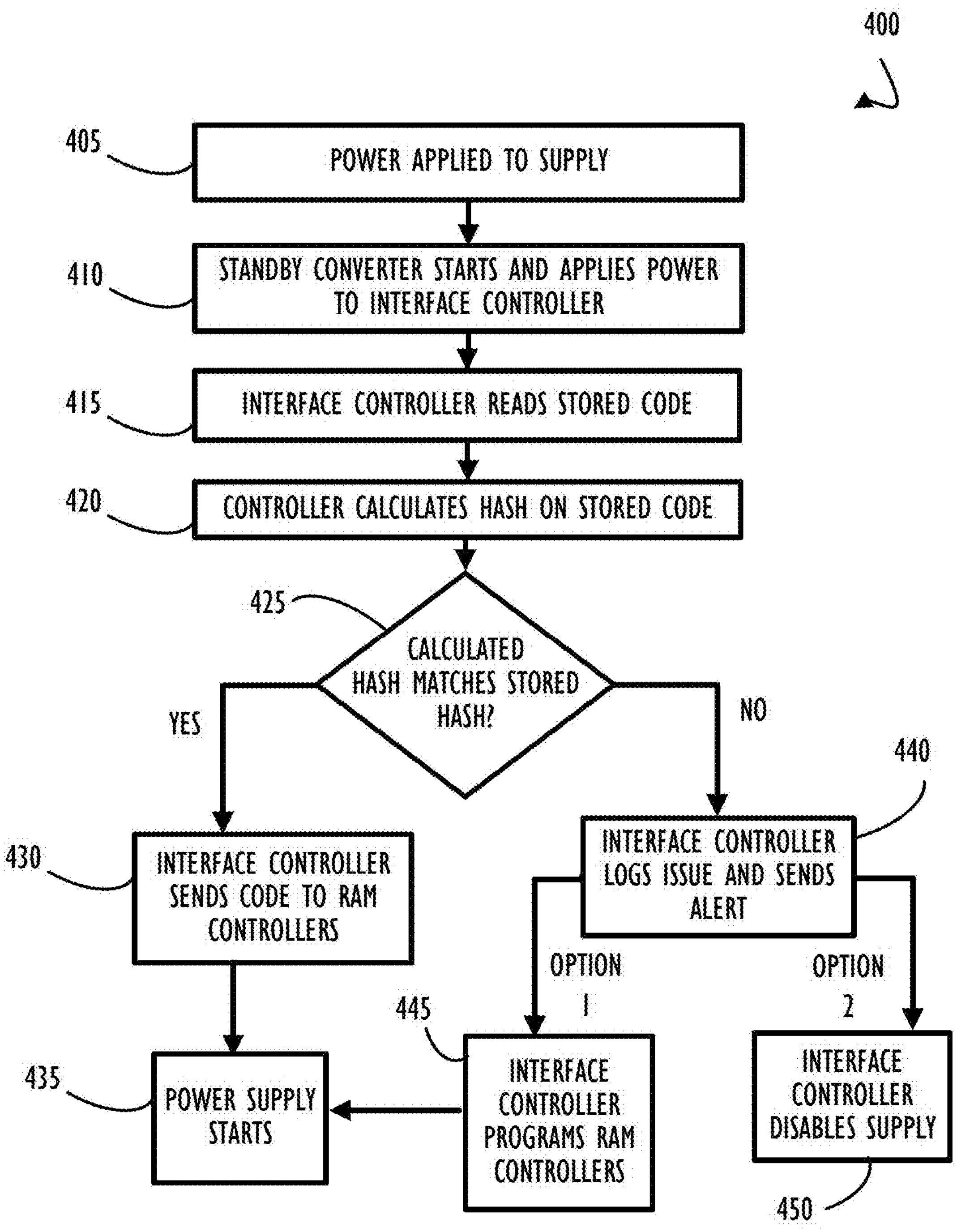
FIG. 4 illustrates an example method, that may be performed in conjunction with the disclosed interface controller, to validate, authenticate, isolate, update, and secure control code that is associated with a commodity device, according to one or more disclosed examples.

In the example of FIG. 4, a flow chart is illustrated as an example method 400 that is representative of an automated technique that may be used in conjunction with an interface controller to validate and initialize control code for a power supply, in accordance with the disclosed examples. As explained above, this technique may also be applicable to commodity devices other than a power supply. Example method 400 begins at with block 405 where power is applied to the power supply. At block 410 a standby converter starts and applies power to the interface controller. Block 415 indicates that the interface controller reads stored code and other information associated with validation of the stored code. In this example, the stored code refers to the above-referenced control code that will control run-time operation of the power supply. Block 420 indicates that an interface controller and its associated processor (e.g., a microcontroller and interface printed circuit board) calculates a hash of the stored code. The hash, in this example, represents a digital signature to uniquely identify a version and contents of the stored code.

Decision 425 indicates that the processor of the interface controller may determine if the calculated hash matches a previously known hash for the stored code. For example, using control code validation and update data 350 from FIG. 3. If the match is successful (the "YES" prong of decision 425), flow continues to block 430 where the interface controller sends (e.g., uploads or initializes a RAM controller associated with the power supply) the stored code to the RAM controller(s). Block 435 indicates that the power supply starts completely to provide power to the entire computer system per its run-time specifications. Although, not specifically illustrated in example method 400, further periodic run-time validations of code within the RAM controllers may be performed to ensure that code has not been altered at run-time.

Returning to decision 425, if the match is not successful (the "NO" prong of decision 425), flow continues to block 440 where the interface controller may log the unsuccessful match and optionally initiate an alert to a system administrator (e.g., via an enterprise management system, not shown). Having noted the unsuccessful match, in some disclosed implementations, there are at least two optional paths that may be followed. For example, depending on a level of security required for a computer system, different options may be provided to react to a potential error situation. In this example, two options are provided. Option 1 is illustrated at block 445 where the interface controller proceeds and programs the RAM controllers of the power supply such that the power supply may start at block 435. In this example, option 1 allows for notification and continued operation of the computer system. Option 2 is illustrated at block 450 where the interface controller disables the power supply. In cases where a computer system has multiple power supplies, and only a subset of the multiple power supplies is disabled, the computer system may be allowed to operate.

In cases where the computer system has all of its power supplies disabled (e.g., non-operational) the computer system will not have power and will likely not operate until a system administrator intervenes to either override the failed match condition or provides information to allow the match to be successful. For example, an update to the optional settings of the computer system may be provided for an update to the validation and update data 350 may be applied. In yet another example, to increase security and prevent interruptions in power, validated backup images could be stored in one-time programmable memory. Instead of disabling the power supply, the interface controller may fall back and program the stored backup image into each respective RAM controller to allow power on of the supply. In this example, the interface controller may still initiate an alert to indicate that the system had a security event.

Figure 5:
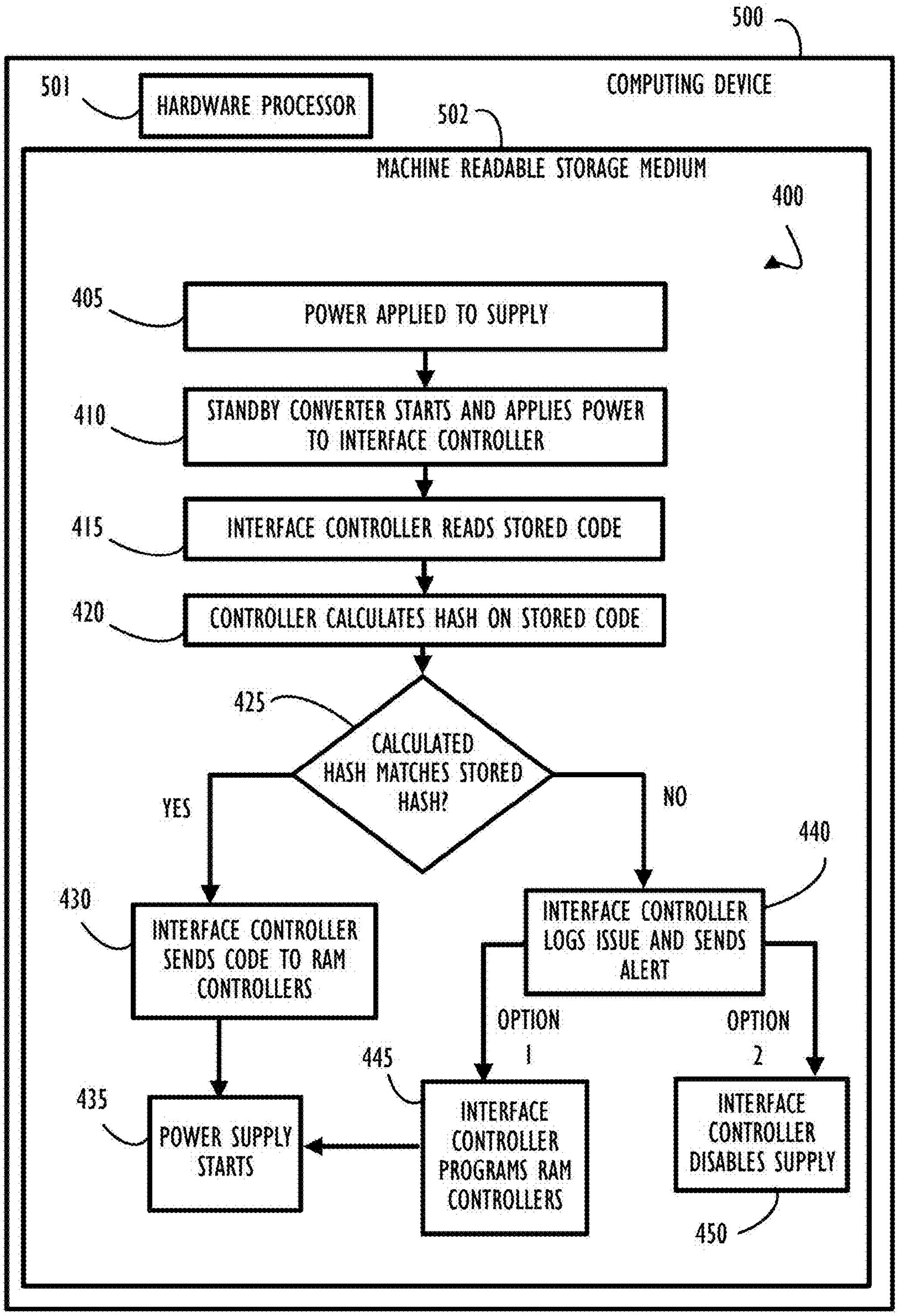
FIG. 5 illustrates an example processor and computer-readable medium used to implement the example method of FIG. 4, according to one or more disclosed examples.

Referring to FIG. 5, shown is an example computing device 500, with a hardware processor 501, and accessible machine-readable instructions stored on a machine-readable medium 502 that may be used to implement the disclosed RAM based controller code initialization and validation, according to one or more disclosed example implementations. FIG. 5 illustrates computing device 500 configured to perform the flow of method 400 as an example. However, computing device 500 may also be configured to perform the flow of other methods, techniques, functions, or processes described in this disclosure. In the example of FIG. 5, machine-readable storage medium 502 includes instructions to cause hardware processor 501 to perform blocks 405-450 discussed above with reference to FIG. 4.

A machine-readable storage medium, such as 502 of FIG. 5, may include both volatile and nonvolatile, removable and non-removable media, and may be any electronic, magnetic, optical, or other physical storage device that contains or stores executable instructions, data structures, program module, or other data accessible to a processor, for example erasable programmable read-only memory ("EPROM"), random access memory ("RAM"), non-volatile random access memory ("NVRAM"), optical disk, solid state drive ("SSD"), flash memory, and the like. The machine-readable storage medium may be a non-transitory storage medium, where the term "non-transitory" does not encompass transitory propagating signals.

Figure 6:
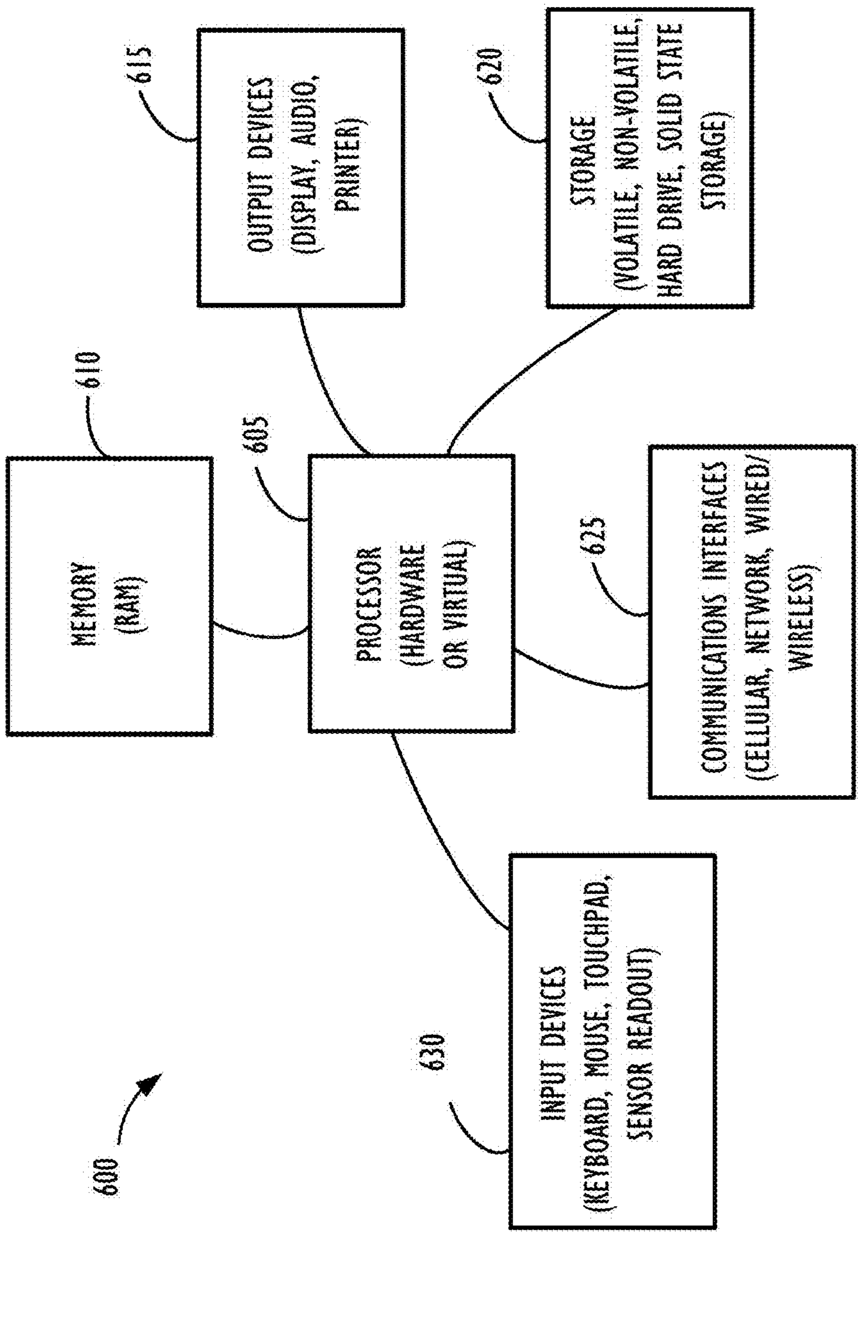
FIG. 6 illustrates a block diagram representation for a computing device that may be used to implement the functions, modules, processing platforms, execution platforms, communication devices, and other methods and processes of this disclosure.

FIG. 6 illustrates a block diagram to represent a computing device 600 that may be used to implement or be used with the functions, modules, processing platforms, execution platforms, communication devices, and other methods and processes of this disclosure. For example, computing device 600 illustrated in FIG. 6 could represent a client device or a physical server device and include either hardware or virtual processor(s) depending on the level of abstraction of the computing device. In some instances (without abstraction), computing device 600 and its elements, as shown in FIG. 6, each relate to physical hardware. Alternatively, in some instances one, more, or all of the elements could be implemented using emulators or virtual machines as levels of abstraction. In any case, no matter how many levels of abstraction away from the physical hardware, computing device 600 at its lowest level may be implemented on physical hardware.

As also shown in FIG. 6, computing device 600 may include one or more input devices 630, such as a keyboard, mouse, touchpad, or sensor readout (e.g., biometric scanner) and one or more output devices 615, such as displays, speakers for audio, or printers. Some devices may be configured as input/output devices also (e.g., a network interface or touchscreen display).

Computing device 600 may also include communications interfaces 625, such as a network communication unit that could include a wired communication component and/or a wireless communications component, which may be communicatively coupled to processor 605. The network communication unit may utilize any of a variety of proprietary or standardized network protocols, such as Ethernet, Transmission Control Protocol/Internet Protocol ("TCP/IP"), to name a few of many protocols, to effect communications between devices. Network communication units may also comprise one or more transceiver(s) that utilize the Ethernet, power line communication ("PLC"), WiFi, cellular, and/or other communication methods.

As illustrated in FIG. 6, computing device 600 includes a processing element such as processor 605 that contains one or more hardware processors, where each hardware processor may have a single or multiple processor cores. In one implementation, the processor 605 may include at least one shared cache that stores data (e.g., computing instructions) that are utilized by one or more other components of processor 605. For example, the shared cache may be a locally cached data stored in a memory for faster access by components of the processing elements that make up processor 605. In one or more implementations, the shared cache may include one or more mid-level caches, such as level 2 (L2), level 3 (L3), level 4 (L4), or other levels of cache, a last level cache ("LLC"), or combinations thereof. Examples of processors include but are not limited to a central processing unit ("CPU") a microprocessor. Although not illustrated in FIG. 6, the processing elements that make up processor 605 may also include one or more of other types of hardware processing components, such as graphics processing units ("GPU"), application specific integrated circuits ("ASICs"), field-programmable gate arrays ("FPGAs"), and/or digital signal processors ("DSPs").

FIG. 6 illustrates that memory 610 may be operatively and communicatively coupled to processor 605. Memory 610 may be a non-transitory medium configured to store various types of data. For example, memory 610 may include one or more storage devices 620 that comprise a non-volatile storage device and/or volatile memory. Volatile memory, such as random-access memory ("RAM"), can be any suitable non-permanent storage device. The non-volatile storage devices 620 can include one or more disk drives, optical drives, solid-state drives ("SSDs"), tap drives, flash memory, read only memory ("ROM"), and/or any other type of memory designed to maintain data for a duration of time after a power loss or shut down operation. In certain instances, the non-volatile storage devices 620 may be used to store overflow data if allocated RAM is not large enough to hold all working data. The non-volatile storage devices 620 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 605. In one implementation, the compiling process of the software program may transform program code written in a programming language to another computer language such that the processor 605 is able to execute the programming code. For example, the compiling process of the software program may generate an executable program that provides encoded instructions (e.g., machine code instructions) for processor 605 to accomplish specific, non-generic, particular computing functions.

After the compiling process, the encoded instructions may then be loaded as computer executable instructions or process steps to processor 605 from storage device 620, from memory 610, and/or embedded within processor 605 (e.g., via a cache or on-board ROM). Processor 605 may be configured to execute the stored instructions or process steps in order to perform instructions or process steps to transform the computing device into a non-generic, particular, specially programmed machine or apparatus. Stored data, e.g., data stored by a storage device 620, may be accessed by processor 605 during the execution of computer executable instructions or process steps to instruct one or more components within the computing device 600. Digital signatures may be generated for a set of computer executable instructions (e.g., the above-referenced control code) to uniquely identify a version of code for security and validation purposes.

A user interface (e.g., output devices 615 and input devices 630) can include a display, positional input device (such as a mouse, touchpad, touchscreen, or the like), keyboard, or other forms of user input and output devices. The user interface components may be communicatively coupled to processor 605. When the output device is or includes a display, the display can be implemented in various ways, including by a liquid crystal display ("LCD") or a cathode-ray tube ("CRT") or light emitting diode ("LED") display, such as an organic light emitting diode ("OLED") display. Persons of ordinary skill in the art are aware that the computing device 600 may comprise other components well known in the art, such as sensors, powers sources, and/or analog-to-digital converters, not explicitly shown in FIG. 6.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A power supply for a computer system, comprising:

a RAM controller (or a power supply controller) to provide operational control of the power supply; and a random-access memory ("RAM") area to store a run-time control code for the RAM controller, wherein the RAM controller has access to the RAM area to obtain the run-time control code, and wherein upon initialization of the power supply, prior to providing an operational power to the computer system, the RAM area receives the run-time control code from an interface controller of the computer system, wherein the run-time control code is validated by the interface controller of the computer system, using information from a control code validation and update area ("CCVUA") prior to providing the run-time control code to the RAM area.

2. The power supply of claim 1, wherein the RAM controller executes the run-time control code exclusively from the RAM area.

3. The power supply of claim 1, wherein validation by the interface controller includes validating a digital signature of the run-time control code.

4. The power supply of claim 1, wherein responsive to a validation failure, the interface controller disables the power supply from supplying power to the computer system.

5. The power supply of claim 1, wherein responsive to a validation failure, the interface controller initiates an alert regarding the failed validation of the run-time control code.

6. The power supply of claim 5, wherein the interface controller programs the RAM controller such that the power supply is configured to start supply of power to the computer system.

7. The power supply of claim 1, wherein responsive to a validation failure, the interface controller identifies a safe backup version of the run-time control code for the RAM area and uploads an identified backup safe version of the run-time control code to the RAM area to allow operation of the power supply.

8. The power supply of claim 1, wherein responsive to a validation success, the interface controller uploads an identified version of the run-time control code to the RAM area.

9. A power supply for a computer system, comprising:

a RAM controller (or a power supply controller) to provide operational control of the power supply;

a random-access memory ("RAM") area to store a run-time control code for the RAM controller, wherein the RAM controller has access to the RAM area to obtain the run-time control code; and an interface controller to provide the run-time control code to the RAM area upon initialization of the power supply and prior to providing an operation power to the computer system, wherein the interface controller validates the run-time control code by using information from a control code validation and update area ("CCVUA") prior to providing the run-time control code to the RAM area.

10. The power supply of claim 9, wherein the RAM controller executes the run-time control code exclusively from the RAM area.

11. The power supply of claim 9, wherein the interface controller validates a digital signature of the run-time control code to perform validation of the run-time control code.

12. The power supply of claim 11, wherein the interface controller, responsive to a validation failure, disables the power supply from supplying power to the computer system.

13. The power supply of claim 11, wherein the interface controller, responsive to a validation failure, initiates an alert regarding the failed validation of the run-time control code.

14. The power supply of claim 13, wherein the interface controller programs the RAM controller such that the power supply is configured to start supply of power to the computer system.

15. The power supply of claim 11, wherein the interface controller, responsive to a validation failure, identifies a safe backup version of the run-time control code for the RAM area and uploads an identified backup safe version of the run-time control code to the RAM area to allow operation of the power supply.

16. The power supply of claim 11, wherein the interface controller, responsive to a validation success, uploads an identified version of the run-time control code to the RAM area.

* * * * *